United States Patent [19]

Schiraldi et al.

[11] Patent Number: 5,582,636
[45] Date of Patent: Dec. 10, 1996

[54] MEDIUM FOR CHINA PAINTS FOR PORCELAIN, CERAMIC, AND STONEWARE ARTICLES

[76] Inventors: Michael T. Schiraldi, 143 Pinecone Rd., Wilmington, N.C. 28409; Rola Joyce Schiraldi, 3701 E. Beach Dr., Long Beach, N.C. 28465

[21] Appl. No.: 492,212

[22] Filed: Jun. 19, 1995

[51] Int. Cl.$^6$ ............... C09D 101/28; C09D 105/00; C09D 105/04; C09D 105/06
[52] U.S. Cl. ............... 106/194.2; 106/205.72; 106/181.1; 524/377; 524/389
[58] Field of Search ............... 106/180, 189; 524/377, 389

[56] References Cited

U.S. PATENT DOCUMENTS

| | | | |
|---|---|---|---|
| 3,640,741 | 2/1972 | Etes | 106/189 |
| 4,315,779 | 2/1982 | Heyd et al. | 106/189 |
| 4,614,545 | 9/1986 | Hess | 106/189 |
| 5,326,390 | 7/1994 | Tecle | 106/189 |

FOREIGN PATENT DOCUMENTS

| | | | |
|---|---|---|---|
| 0281252 | 9/1988 | European Pat. Off. | 106/189 |
| 0120672 | 9/1980 | Japan | 106/189 |
| 796308 | 6/1958 | United Kingdom | 106/189 |

*Primary Examiner*—David Brunsman
*Attorney, Agent, or Firm*—Brian K. Dinicola

[57] ABSTRACT

New media have been developed for china paints useful for painting or decorating porcelain bisque, ceramic and stoneware articles. These media, consisting of low surface tension glycols and water soluble polymers, enable the artisan to paint non-blotching surfaces, fine lines and details and multiple layers without a separate kiln firing between layers.

9 Claims, No Drawings

180
MEDIUM FOR CHINA PAINTS FOR PORCELAIN, CERAMIC, AND STONEWARE ARTICLES

BACKGROUND OF THE INVENTION

China painting or decorating on stoneware, ceramic and porcelain surfaces, i.e., figurines and dolls, etc., traditionally have relied on oil based media in the mixing of paints. Modern techniques have evolved to the use of water soluble or water reducible media. These have been limited to the use of glycerin as the medium or solvent. Difficulties that have been experienced with glycerin relate to its very high surface tension making the resulting paint (after mixing glycerin with pigment powder) difficult to wet large surface areas without blotching. As an improvement over glycerin, polyethylene glycol has been used with limited success; though polyethylene glycols have lower surface tensions than glycerin, the improvement is marginal due to the inadequate rheological properties needed to facilitate uniform spreading. The medium, whether glycerin or polyethylene glycol, is typically mixed with dry pigments or color to a suitable consistency and applied by brush, sponge or the like to the surface of the ceramic, porcelain or stoneware. At times water is added to the mixture to reduce the viscosity of the painted surface. There are also times when the artisan, in order to obtain a point on the end of the brush may insert it in their mouth, and apply saliva, a practice, though widely used, that is severely discouraged due to the heavy metals, especially lead, in the pigments. Multiple layers of paint in the same area typically require separate firings after each layer of paint has been applied. The painted surface is fired then at elevated temperatures in a kiln to ca 1290° F.

It is an object of the new invention, when the medium is properly mixed with pigments, to paint long, continuous fine lines on porcelain, ceramic and stoneware without resorting to constant reloading of the brush after one or two lines have been painted.

Another object of the invention is to be able to apply an even hue or color over large areas without "blotching".

Yet another object of this invention is to apply a paint in which the color is very close or identical to what is observed after china firing at elevated temperatures.

Still another object of this invention is to be able to move the paint (medium and pigment) on a ceramic, porcelain or stoneware surface with a brush without rewetting the surface.

Another object of this invention is to easily correct, i.e. remove a small defect of error in painting without redoing the entire surface.

Still another object of this invention is to be able to paint multiple layers of color (two or more) in the "wet" state without resorting to firing after each single application of the paint and without the colors running together, but yet remaining true after firing at elevated temperatures.

Other objects of this invention will become apparent to those that are skilled in the art.

SUMMARY OF THE INVENTION

The new medium is composed of three basic materials. The first are water soluble, low molecular weight glycols that are liquid at room temperature. These may be polyethylene glycols, propylene glycol, block copolymers of polyethylene glycol and polypropylene glycol, polypropylene glycols and other glycols. The important features of these glycols are that not only are they water soluble and non toxic, but that the surface tensions of the glycols are in the 35–55 dyne/cm range, appreciably lower than the high surface tension of water (70–72) or glycerin (high 60s) or the mixture of glycerin-water in which the surface tension of these solutions are very high. Even in the presence of water the surface tension of the glycol-water solution is dominated by the surface active characteristics of the glycol. The significantly lower surface tension of the new medium imparts the important ability to facilitate spreading. The second basic material are water soluble polymers, such as sodium carboxy methyl cellulose, hydroxy propyl cellulose, methyl cellulose, polyethylene oxide, poly vinyl pyrollidone, hydroxy ethyl cellulose, hydroxy propyl methyl cellulose, natural occurring gums such as the alginates, guar gum, arabic, xantham. These polymers when dissolved in the appropriate glycol are present in low concentrations, from 0.1 up to 10.0 wt/wt % and imparts the ability to paint or form long lines and also contributes to uniform spreading by not increasing the surface tension of the solutions and significantly contributes to uniform coatings that are non-blotching. These media typically have a bitter taste, unlike glycerin which is sweet, discouraging insertion of the end of the brush in the mouth so as to achieve a fine point. The medium may also contain water, up to 65% by weight, which facilitates "drying" of the paint which is especially useful in applying multiple layers without resorting to firing between layers.

DESCRIPTION OF THE INVENTION

The medium may be composed of three main ingredients: glycols or mixtures of glycols which are normally liquid at room temperature and water soluble polymers that are also soluble in these glycols and a third ingredient, namely water.

The glycols comprise the bulk of the medium up to 99.9% by weight. These glycols come from the class of materials that are not only water soluble, but are also surface active, i.e., surface tensions that are significantly lower than glycerin (66 dynes/cm) and water (72 dynes/cm). The liquid polyethylene glycols, which are polyethylene ethers with hydroxy end groups, such as Carbowax 200, 300, 400 and 600 from Union Carbide, have surface tension ca 44 dynes cm. Propylene glycol is 36 dynes/cm. The poloxamers such as the Pluronics L64 and L92 are ABA block copolymers of polyethylene glycol and polypropylene glycol with the latter as the mid group have surface tensions that range from 35 to 45 dynes/cm. Polyglycolic add, which are similar structurally to polyethylene glycol except that the end groups are carboxy terminated, also have surface tensions in the mid 40 dynes/cm range. The Tetronics which are also BAB block copolymers with polypropylene glycol and polyethylene glycol as the mid block also manifest surface tensions in the mid 40 dynes/cm range. All the above and many others that will be apparent to those familiar with the state of the art, have significantly lower surface tension than water and glycerin.

The lower surface tension of the medium enables the artisan to more readily wet the pigment or mixture of pigments to form a uniform colored paint. This low surface tension enables the artisan to paint large ceramic or porcelain surfaces easily. How ever, it is not sufficient to ensure that the large surface areas are uniform and nonblotchy.

If painted lines, shadows, highlights or small areas or where fine details are desired, the addition of the second class of ingredients, namely the water soluble polymers, enables the artisan to form long continuous lines, such as the lashes and eyebrows on dolls or figurines. The addition of water soluble polymers influences the rheology of the medium due to the high molecular weight of these polymers. The extended chains of these polymers in the medium enables the paint to form long continuous lines that are stable, i.e., do not break up on extension of the brush. The addition of the water soluble polymers impart a film like quality in the wet state to the medium which enable the artisan to readily move the medium-pigment mixture with a brush or sponge to ensure uniform coatings that are non-blotchy. These water soluble polymers are the modified celluloses such as sodium carboxy methyl-, hydroxl propyl-, hydroxy ethyl-, hydroxy propyl methyl-, methyl-cellose, polyvinyl pyrollidone, polyethylene oxide, the naturally occurring and modified gums such as the alginates, gum arabic, guar gum, pectin, xantham, etc. These polymers are added to the glycols as little as 0.01 weight percent up to 10.0 weight percent.

The addition of these polymers, which impart a film like character to the medium, enable the artisan to form continuous, integral multiple layers of paint or colors to be applied without firing the painted surfaces between application of the paints. The second layer covers the first layer without smearing, blending or intermingling the layers so that the true color remains unchanged during firing. Layers up to five have been successfully painted with the true colors remaining, and the medium still burning off in the firing without disrupting the surface.

The third ingredient is water, which may be in the formulation up to 65% by weight. The presence of water is also very useful in painting multiple layers with each layer forming a dry paint due to the water evaporating off. Layer upon layer can be painted in this fashion without requiring firing in a kiln at elevated temperatures between each layer.

DETAILED DESCRIPTION OF THE PREFERRED EMBODIMENTS

The low surface tension of the media, especially the contributions made by the glycols, enable the artisan to apply uniform coatings to large areas of ceramic and porcelain surfaces. However, this is insufficient as the examples below illustrate.

EXAMPLE 1 AND COMPARATIVE EXAMPLE A

A medium for an overall wash coat of paint was made by heating 700 parts by weight of Carbowax 300, a polyethylene glycol manufactured by Union Carbide Company of Bound Brook, N.J., to 55°–60° C. To this was added 3 parts of Klucel MF, a hydroxy propyl cellulose manufactured by Aqualon company of Wilmington, Del. and stirred until completely dissolved (example 1). The cooled solution was mixed with Bisque Tone 1, DGBT01 ,a pink beige skin tone pigment sold by Seeley's Ceramic Company in Oneonta, N.Y., approximately 3 parts medium to 2 parts pigment. The paint was mixed on a white ceramic tile with a spatula knife until all the pigment was completely wetted and a smooth consistency was obtained. As a comparison, Carbowax 300 was solely mixed with Bisque Tone 1 (comparative example A) in the same fashion discussed above. Each of the paints were applied to the surface of two white porcelain bisque doll heads with a soft sponge and then brushed out smoothly and uniformly with a "China Mop" brush. The coatings were fairly uniform. Both painted heads were deliberately handled such that the wet painted surface was smudged with fingerprints. To the head coated with the new medium of example 1, a China mop brush was solely used to "correct" the blemishes introduced by the fingerprints; the paint freely moved with the action of the brush and an uniform surface was quickly attained without the addition of more paint. To the head coated with Carbowax 300 only, the medium of comparative example A, the blemishes introduced by fingerprints could not be corrected by using a China mop only as was done above; the paint would not readily move. In order to correct the blemishes, additional paint had to be applied with a soft sponge. Both painted porcelain dolls was china fired in an Evenheat Kiln, model Firematic DTP-56DC-E to a temperature of 1285° F. (cone 018). The resultant hue of the surface coated with the medium of example 1 was uniform and nonblotchy. The resultant hue of the surface coated with the medium of comparative example A manifested areas that were not uniform and were blotchy.

EXAMPLE 2

A popular, but difficult color to successfully paint are yellow reds. This is used with difficulty to paint small details, especially lips on porcelain dolls. The difficulty lies in the inability of glycerin to completely wet this pigment. 1000 grams of Propylene glycol, with a low surface tension (36 dynes/cm) was heated to 45° C. To this was added five grams of Methocel E25, a methyl cellulose from the Dow Chemical Corporation from Midland, Mich. and stirred until the polymer was completely dissolved. The cooled medium was blended (using the same procedures in example 1) with Yellow Red, (DGR04, Seeley's) The yellow red wetted very well and the painted, fired coating was uniform and non blotchy.

EXAMPLE 3

Excellent lines or fine details are painted on porcelain or ceramic figures because of the elongational viscosity imparted to the glycols by the water soluble polymers. The polymers stabilize the elongational flow or line due to its high molecular weight. Six grams of Klucel G, a hydroxy propyl cellulose was added to 700 grams of heated (ca 45° C.) Carbowax 400, until completely dissolved. The cooled medium was blended using the procedure outlined in Example 1 with Satin Black, (DSB01,Seeley's) The approximate ratios, by volume, was one part medium to two parts Satin Black. The paint was applied by a trimmed Eyelash 1 Brush,(Seeley's) Fine lines were painted with excellent control of the line thickness and color intensity without resorting to reloading the brush with paint after each stroke.

EXAMPLE 4

Artisans have become accustomed to applying a color or paint to an area of a figurine and then firing the object at elevated temperatures in order to paint a second color or paint on the first applied paint. For applications where multiple layers in the same area is desired, e.g., eye brows where a soft underbrow is followed by a detailed brow or eyes where iris, pupil, shades of color to present depth as well as highlights, the artisan required multiple firings between applied coats. The medium of example 1 was blended with various pigments to paint eyes on a white porcelain doll. A mixture of Slate Blue (DGBL07, Seeley's) and Sapphire Blue (DGBL08, Seeley's) was used for the iris. Over this, Indigo (DGBL09, Seeley's) was added to the above blue mixture to complete the shading. Satin Black (DSB01, Seeley's) was painted over this to form the pupil and a white highlight using Whipped Cream (DMW04, Seeley's) in the corner of the pupil was painted. No firing was done between each of the various steps. One firing was done in a kiln at 1290° F. and the resulting painted eye was true to color and did not run or mix together.

EXAMPLES 5 TO 8

Artisan that are skilled in painting and are very economical in their paint strokes use a fast drying medium that sets up the surface for multiple layers to be applied wet. The more skillful the artisan the faster the drying time. This is a standard practice when the media are oil based. This has not been the practice for water based or water reducible media. When water is added to glycerin or polyethylene glycol the drying times are faster, but to no advantage in painting multiple layers. In the examples below, water is added to control the drying rate.

|  | 5 | 6 | 7 | 8 |
|---|---|---|---|---|
| Carbowax 400 | 200 | 500 | 600 | 600 |
| Water | 500 | 200 | 100 | 100 |
| Klucel M | 3 | 3 | 3 | — |
| Klucel E | — | — | — | 4.5 |
| Drying Rate | Fast | Medium | Slow | Slow |

Example 5 was used to paint multiple layers exactly using the method shown in example 4. Example 6 was also used to paint multiple layers using the method of example 4, but the rate of drying was not as fast enabling the artisan to take more time for applying the layers. Examples 7 and 8 were used for applying lines such as eyelashes and for applying underbrows and eyebrows as multiple wet layers. All the applications here were fired in a kiln at elevated temperatures without the colors running together and remaining true.

EXAMPLE 9

Another medium that is useful for painting difficult pigments contains polypropylene glycol, which has a surface tension similar to propylene glycol, approximately 35–37 dynes/cm. Only the low molecular weight glycols are water soluble; as we get above 1200 daltons, the water solubility decreases significantly. Plurocol P Polyol 410 is a polypropylene glycol of approximately 1250 daltons molecular weight that is manufactured by BASF Corporation. To 400 grams of Plurocol 410 is added 10 grams of Carbowax 3350 and heated until 40°–45° C. and stirred until completely dissolved. Upon cooling to room temperature it forms a gel like substance that readily mixes in with powder pigments as described by the method of example 1. This medium-pigment mixture spread uniformly without blotching over large areas of porcelain when Bisque Tone 2 was used as the pigment.

EXAMPLE 10

To 300 grams of heated Polyol 410 was added 6 grams of polyvinyl pyrrolidone, PVP-K90, a polymer manufactured by ISP Corporation of Wayne, N.J. It was stirred at 40°–45° C. until completely dissolved. This medium was also blended with dry pigments by the same method described in Example 1. This medium was blended with Satin Black pigment and excellent lines were drawn (eye lashes and eye brows).

EXAMPLE 11

To 350 grams of Plurocol Polyol 410 was added 25 grams of distilled water and heated to 40°–45° C. To this was added three grams of Klucel MF and stirred until completely dissolved. This cooled medium was blended (using the same procedures in example 1) with Yellow Red (DGR04, Seeley's) The Yellow Red paint wetted the porcelain very well and the painted, fired coating was uniform and nonblotchy.

EXAMPLES 12, 13, 14 AND 15

Painting of layer upon layer of wet paint without intermingling of the paints can also be facilitated with the following four formulas:

|  | 12 | 13 | 14 | 15 |
|---|---|---|---|---|
| Plurocol P Polyol 410 | 600 | 500 | 400 | 300 |
| Water | 100 | 200 | 300 | 400 |
| Klucel M | 3 | 4 | 5 | 6 |
| Drying Rate | Slow | Moderate | Moderate to fast | Fast |

All formulas above were made according to the techniques in Examples 5 to 8. The drying rate refers to the amount of water that can be evaporated. Each of the formulas were blended with Sapphire Blue (DGBL08, Seeley's) and blended according to the techniques All formulas above were made according to the techniques in Examples 5 to 8. The drying rate refers to the amount of water that can be evaporated. Each of the formulas were blended with Sapphire Blue (DGBL08, Seeley's) and blended according to the techniques of example 1. On each tile, the blended paint dried after thorough mixing. A clean brush was dipped into water, the excess water shaken off and the brush stirred into the dried paint. Fine lines were drawn on a porcelain surface that immediately dried (water evaporated off). Other lines can be drawn on the dried blue paint without smearing the paint; this was done up to five distinct layers. The five layered, painted porcelain surface was china fired in a kiln to 1294° F. and the paint showed distinct and true colors. Different pigments (blue, brown, red, etc.) were painted by the above procedure and again the same excellent results were obtained. This method of painting is analogous to watercolor paint; when the dried paint on the palette is to be painted. some water is added to the palette, to make the paint ready for use.

EXAMPLE 16

Concentrates of paint, i.e., medium-pigment powder mixtures, present a convenient form for the artisan. If these concentrates of premixed paint are dispensed from a tube, a series of different colored paints would be readily available to the artisan. To the medium of example 1 was added Bisque Tone 1 (DGBT01, Seeley's), the ratio being 3:5 and thoroughly blended until completely uniform. The consistency of the resulting mixture was such that it could be pumped into plastic tubes. The paint was readily dispensed by squeezing the tube.

EXAMPLE 17

To the medium of Example 11 was added Yellow-red (DGR04, Seeley's) in the ratio 1:2 and thoroughly blended until completely uniform. the paint had the necessary consistency for dispensing through a tube.

While the invention has been described and disclosed with reference to the preferred embodiments thereof, those skilled in the art will understand and appreciate that numerous variations in the basic formulations or substitution of materials, may be made, but still fall within the intended scope of the invention.

I claim:

1. A composition for making a china paint medium for porcelain, ceramic, or stoneware comprising:

a medium including at least one low molecular weight liquid, glycol selected from the group consisting of polyethylene glycol, polypropylene glycol, poloxamers, polyglycolic acid and tetronics;

at least one water- and glycol- soluble polymer selected from the group consisting of hydroxy propyl cellulose, hydroxy ethyl cellulose, polyethylene oxide including the higher molecular weight polyethylene glycols which are not liquid at room temperature, polyvinyl pyrrolidone and the group consisting of the naturally occurring and modified gums, including alginates, gum arabic, guar gum, pectin, and xanthan; and water, wherein the glycol is present in an amount between 40 and 99.9 weight percent, the water- and glycol-soluble polymer is present in an amount between 0.01 and 2.5% and the water is present in an amount not exceeding 60.0 weight percent.

2. The composition according to claim 1, further including an effective amount of pigment powder such that said composition may be dispensed from a tube and applied to a porcelain, ceramic, or stoneware article.

3. The composition according to claim 2 wherein the ratios of the medium to the pigment powder is between 1:5 to 5:1.

4. A composition for making a china paint medium for porcelain, ceramic, or stoneware comprising:

a medium including at least one low molecular weight liquid, glycol selected from the group consisting of polyethylene glycol, polypropylene glycol, poloxamers, polyglycolic acid and tetronics; and at least one water- and glycol- soluble polymer selected from the group consisting of hydroxy propyl cellulose, hydroxy ethyl cellulose, polyethylene oxide including the higher molecular weight polyethylene glycols which are not liquid at room temperature, polyvinyl pyrrolidone and the group consisting of the naturally occurring and modified gums, including alginates, gum arabic, guar gum, pectin, and xanthan, wherein the glycol is present in an amount between 40 and 99.9 weight percent, the water- and glycol-soluble polymer is present in an amount between 0.01 and 2.5%.

5. The composition according to claim 4, further including an effective amount of pigment powder such that said composition may be dispensed from a tube.

6. The composition according to claim 5 wherein the ratios of the medium to the pigment powder is between 1:5 to 5:1.

7. A composition for making a china paint for porcelain, ceramic, or stoneware comprising:

a medium including at least one low molecular weight liquid, at room temperature, glycol; and at least one water- and glycol- soluble polymer; and an effective amount of pigment powder, wherein the glycol is present in an amount between 40 and 99.9 weight percent, and the water- and glycol-soluble polymer is present in an amount between 0.01 and 2.5%.

8. The composition according to claim 7, wherein said medium further includes water in an amount by weight of water not exceeding 60%.

9. The composition according to claim 7, wherein the ratio of the medium to the pigment powder is between from 1:5 to 5:1.

* * * * *